US011915500B2

(12) United States Patent
Zhou et al.

(10) Patent No.: US 11,915,500 B2
(45) Date of Patent: Feb. 27, 2024

(54) NEURAL NETWORK BASED SCENE TEXT RECOGNITION

(71) Applicant: Salesforce, Inc., San Francisco, CA (US)

(72) Inventors: Pan Zhou, Singapore (SG); Peng Tang, Union City, CA (US); Ran Xu, Mountain View, CA (US); Chu Hong Hoi, Singapore (SG)

(73) Assignee: Salesforce, Inc., San Francisco, CA (US)

( * ) Notice: Subject to any disclaimer, the term of this patent is extended or adjusted under 35 U.S.C. 154(b) by 279 days.

(21) Appl. No.: 17/161,378

(22) Filed: Jan. 28, 2021

(65) Prior Publication Data
US 2022/0237403 A1 Jul. 28, 2022

(51) Int. Cl.
*G06V 20/00* (2022.01)
*G06V 20/62* (2022.01)
(Continued)

(52) U.S. Cl.
CPC ............. *G06V 20/63* (2022.01); *G06F 18/25* (2023.01); *G06N 3/045* (2023.01); *G06N 3/08* (2013.01);
(Continued)

(58) Field of Classification Search
CPC .......... G06N 3/045; G06N 3/044; G06N 3/08; G06N 3/0442; G06V 20/63; G06V 30/10; G06V 10/82; G06V 20/46; G06V 30/153; G06V 20/62; G06V 30/413; G06V 20/00; G06V 30/414; G06V 10/806; G06V 10/7715; G06V 20/70; G06V 40/193;
(Continued)

(56) References Cited

U.S. PATENT DOCUMENTS

2019/0130204 A1* 5/2019 Li .................. G06V 30/18143

OTHER PUBLICATIONS

Yang et al, Recurrent Highway Networks with Attention Mechanism for Scene Text Recognition, 2017 International Conference on Digital Image Computing: Techniques and Applications (DICTA) (Year: 2017).*

(Continued)

*Primary Examiner* — Ping Y Hsieh
*Assistant Examiner* — Xiao Liu
(74) *Attorney, Agent, or Firm* — Haynes and Boone LLP

(57) ABSTRACT

A system uses a neural network based model to perform scene text recognition. The system achieves high accuracy of prediction of text from scenes based on a neural network architecture that uses double attention mechanism. The neural network based model includes a convolutional neural network component that outputs a set of visual features and an attention extractor neural network component that determines attention scores based on the visual features. The visual features and the attention scores are combined to generate mixed features that are provided as input to a character recognizer component that determines a second attention score and recognizes the characters based on the second attention score. The system trains the neural network based model by adjusting the neural network parameters to minimize a multi-class gradient harmonizing mechanism (GHM) loss. The multi-class GHM loss varies based on a level of difficulty of the sample.

19 Claims, 8 Drawing Sheets

(51) Int. Cl.
*G06N 3/08* (2023.01)
*G06F 18/25* (2023.01)
*G06N 3/045* (2023.01)
*G06V 30/19* (2022.01)
*G06V 30/16* (2022.01)

(52) U.S. Cl.
CPC .... *G06V 30/1607* (2022.01); *G06V 30/19147* (2022.01); *G06V 30/19167* (2022.01)

(58) Field of Classification Search
CPC .... G06V 30/158; G06V 30/242; G06F 18/24; G06F 18/25; G06F 30/27; G06F 18/213; G06F 16/3344; G06F 40/279; G06F 16/7844
See application file for complete search history.

(56) References Cited

OTHER PUBLICATIONS

Gao et al,Dense Chained Attention Network for Scene Text Recognition, 2018 25th IEEE International Conference on Image Processing (ICIP) (pp. 679-683) (Year: 2018).*
Haritaoglu, InfoScope: Link from Real World to Digital Information Space, Ubicomp 2001: Ubiquitous Computing pp. 247-255 (Year: 2001).*
Luo et al, MORAN: a multi-object rectified attention network for scene text recognition, Pattern Recognition 90 (Year: 2019).*
Dmochowski et al, Maximum Likelihood in Cost-Sensitive Learning: Model Specification, Approximations, and Upper Bounds, Journal of Machine Learning Research 11, pp. 3313-3332 (Year: 2010).*
Hu et al, GTC: Guided Training of CTC towards efficient and accurate scene text recognition, AAAI (Year: 2020).*
Li et al, Gradient Harmonized Single-Stage Detector, AAAI (Year: 2019).*
Woo et al, CBAM: Convolutional Block Attention Module, ECCV (Year: 2018).*
Zhang et al, Residual Non-Local Attention Networks for Image Restoration, ICLR (Year: 2019).*
Kim et al, Bilinear Attention Networks, NeurIPS (Year: 2018).*
Bahadanau, D. et al., "Neural Machine Translation by Jointly Learning to Align and Translate," arXiv:1409.0473, Sep. 2014, pp. 1-15.
Bai, F. et al., "Edit probability for scene text recognition," Proceedings of the IEEE Conference on Computer Vision and Pattern Recognition, May 2018, pp. 1508-1516.
Chelba, C. et al., "One BillionWord Benchmark for Measuring Progress in Statistical Language Modeling," arXiv:1312.3005, Dec. 11, 2013, pp. 1-6.
Cheng, Z. et al., "Focusing Attention: Towards Accurate Text Recognition in Natural Images," Proceedings of the IEEE International Conference on Computer Vision (ICCV), Oct. 2017, pp. 5076-5084.
Chorowski, J. et al., "Attention-based models for speech recognition," Advances in Neural Information Processing Systems, Dec. 2015, pp. 577-585.
Gers, F. et al., "Learning to Forget: Continual Prediction with LSTM," Neural Computation, Oct. 2000, pp. 1-19.
Graves, A. et al., "Connectionist Temporal Classification: Labelling Unsegmented Sequence Data with Recurrent Neural Networks," Proceedings of the 23rd international conference on Machine learning, 2006, pp. 369-376.
Gupta, A. et al., "Synthetic data for text localisation in natural images," Proceedings of the IEEE conference on computer vision and pattern recognition, Apr. 2016, pp. 2315-2324.
Hu, W. et al., "GTC: Guided Training of CTC towards Efficient and Accurate Scene Text Recognition," The Thirty-Fourth AAAI Conference on Artificial Intelligence (AAAI-20), Apr. 3, 2020, pp. 11005-11012.
Jaderberg, M. et al., "Synthetic Data and Artificial Neural Networks for Natural Scene Text Recognition," arXiv:1406.2227, Dec. 9, 2014, pp. 1-10.
Karatzas, D. et al., "ICDAR 2013 robust reading competition," 12th International Conference on Document Analysis and Recognition, Aug. 2013, pp. 1484-1493.
Karatzas, D. et al., "ICDAR 2015 Competition on Robust Reading," 13th International Conference on Document Analysis and Recognition (ICDAR), Aug. 2015, pp. 1156-1160.
Kim, S. et al., "Joint CTC-attention based end-to-end speech recognition using multi-task learning," 2017 IEEE International Conference on Acoustics, Speech and Signal Processing (ICASSP), Mar. 2017, pp. 4835-4839.
Li, B. et al., "Gradient Harmonized Single-Stage Detector," The Thirty-Third AAAI Conference on Artificial Intelligence (AAAI-19), Jul. 2019, pp. 8577-8584.
Long, S. et al., "Scene Text Detection and Recognition: The Deep Learning Era," Nov. 2018, pp. 1-24.
Lucas, S.M. et al., "ICDAR 2003 Robust Reading Competitions," Proceedings of the Seventh International Conference on Document Analysis and Recognition (ICDAR 2003), Aug. 2003, pp. 1-6.
Luo, C. et al., "Learn to Augment: Joint Data Augmentation and Network Optimization for Text Recognition," Proceedings of the IEEE/CVF Conference on Computer Vision and Pattern Recognition (CVPR), Jun. 2020, pp. 13746-13755.
Luo, C. et al., "MORAN: A Multi-Object Rectified Attention Network for Scene Text Recognition," arXiv:1901.03003, Jan. 10, 2019, pp. 1-15.
Mikolov, T. et al., "Extensions of recurrent neural network language model," 2011 IEEE International Conference on Acoustics, Speech and Signal Processing (ICASSP), May 2011, pp. 5528-5531.
Mishra, A. et al., "Scene text recognition using higher order language priors," BMVC—British Machine Vision Conference, Sep. 2012, pp. 1-12.
Phan, T.Q. et al., "Recognizing Text with Perspective Distortion in Natural Scenes," Proceedings of the IEEE International Conference on Computer Vision, Dec. 2013, pp. 569-576.
Risnumawan, A. et al., "A robust arbitrary text detection system for natural scene images," Expert Systems with Applications, vol. 41, Jul. 17, 2014, pp. 8027-8048.
Shi, B. et al., "An End-to-End Trainable Neural Network for Image-Based Sequence Recognition and Its Application to Scene Text Recognition," arXiv:1507.05717, Jul. 21, 2015, pp. 1-9.
Wang, K. et al., "End-to-end scene text recognition," 2011 International Conference on Computer Vision, Nov. 2011, pp. 1457-1464.
Wang, T. et al., "Decoupled Attention Network for Text Recognition," The Thirty-Fourth AAAI Conference on Artificial Intelligence (AAAI-20), Apr. 3, 2020, pp. 12216-12224.

\* cited by examiner

NEURAL NETWORK BASED SCENE TEXT RECOGNITION

BACKGROUND

Field of Art

The disclosure relates in general to artificial intelligence based techniques for scene text recognition, and more specifically to neural network based scene text recognition that uses attention mechanism.

Description of the Related Art

Scene text recognition is performed in computer vision tasks for applications that perform text detection in natural scenes, for example, traffic sign reading, object recognition, intelligent inspection, and image searching. Scene text detection is challenging because texts can have diversified shapes and the scene may have complex backgrounds, irregular shapes, and texture interference. Artificial intelligence techniques using neural networks have been used for scene text recognition including deep learning and sequence-to-sequence learning. These techniques combine output from multiple neural networks, for example, convolutional neural networks (CNN) or recurrent neural network (RNN) to align text image feature and characters in the text. However, these techniques result in error accumulation and propagation. For example, the system first decodes image feature to determine character embedding/features, and then uses the decoded information as the current state information of RNN or LSTM. If one character is predicted incorrectly the resulting error affects the result of subsequent predictions resulting in error accumulation. Furthermore, these techniques have low precision for long text sequences.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG. 1 is a block diagram of a system environment including a computing system that uses a double attention network, in accordance with an embodiment FIG. 2 illustrates the system architecture of the double attention neural network, in accordance with an embodiment.

Figure 1:
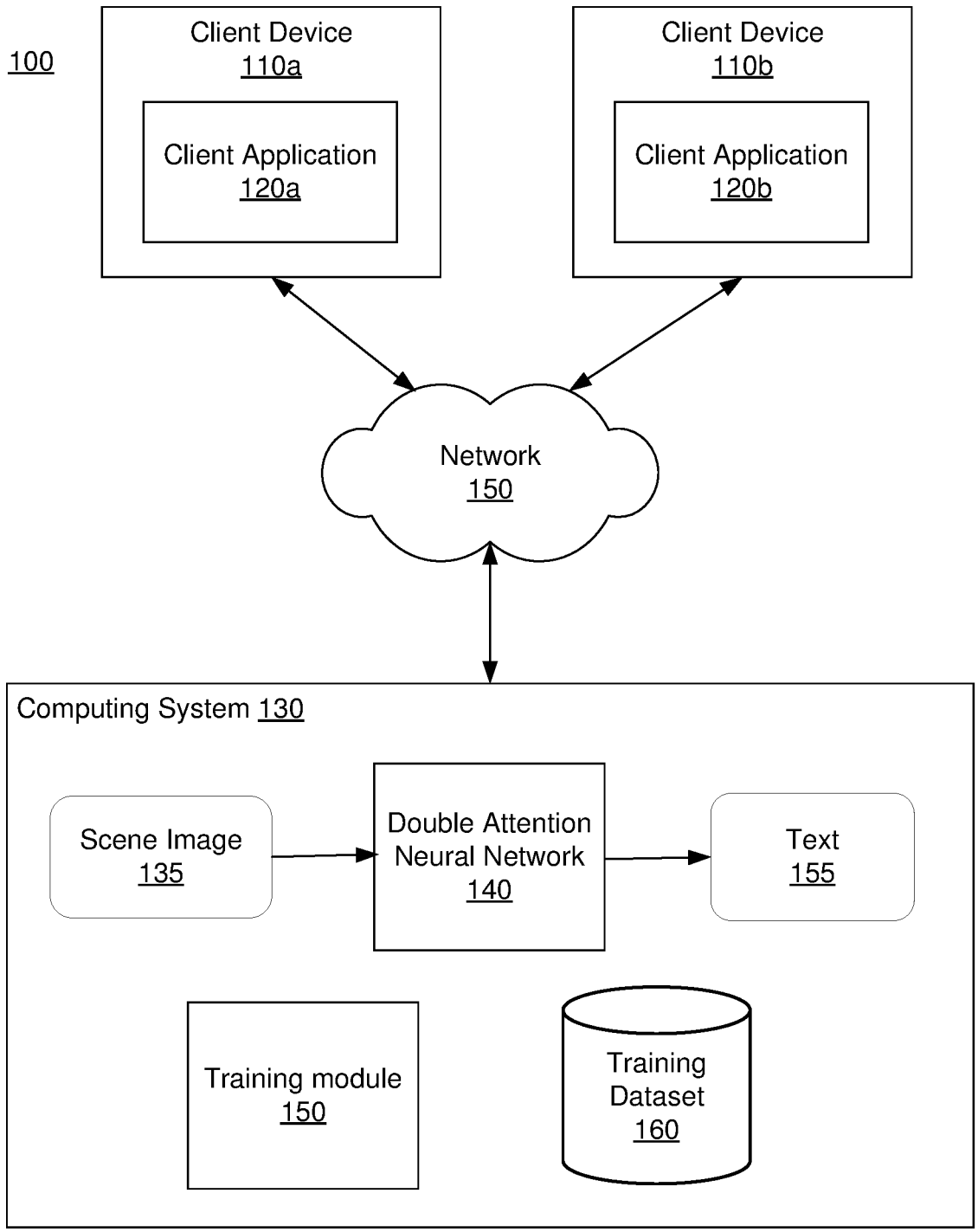

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures.

DETAILED DESCRIPTION

A neural network performs scene text recognition, i.e., recognizing text in a scene, for example, traffic signs, product recognition, and so on. The neural network uses attention mechanism to focus on a portion of the image and ignore the remaining image. Conventional techniques using attention mechanism for scene text recognition have alignment problems where the system gets confused by substrings that repeat in the text. For example, if the substring "ly" appears in multiple places, the neural network predictions may be incorrect. For example, while decoding a sentence "Hardly likely, my . . . ", the system encounters two substring "ly", once as part of the keyword "Hardly" and again as part of the keyword "likely." The system while processing the substring "ly" of "likely" keyword gets confused and determines that it is processing the keyword "Hardly" again. Accordingly, the system predicts the text as "Hardly likely" since it decodes "likely" twice. This results in incorrect processing of the input text and error in the predicted text. The double attention neural network disclosed herein according to various embodiments is able to distinguish between the different occurrences of the same substring and is able to accurately predict the scene text for examples where conventional techniques fail.

The system disclosed improves the accuracy of prediction of text from scenes compared to conventional techniques based on: (1) a neural network architecture that uses double attention mechanism and (2) a multi-class gradient harmonizing mechanism (GHM) loss for training the neural network based model.

The neural network architecture comprises (1) a visual (image) feature extractor that generates visual features based on an input image; (2) an attention feature extractor that generates attention maps based on the visual features, and (3) an attention-based character recognizer that receives as input, a mixed feature that integrates visual features and attention features and predicts the text in the input image.

The attention-based character recognizer uses bidirectional long short term memory (BLSTM) recurrent neural networks (RNN) to learn spatial relations in the mixed feature and uses attention mechanism based on a Gated Recurrent network (GRU) to align the character positions and the spatial features. The term spatial feature refers to the output of the BLSTM. The attention-based character recognizer determines a second attention score to weigh hidden states. Accordingly, the neural network architecture uses the attention mechanism twice and is able to align characters better.

A challenging problem for text recognition training is the imbalance between easy and hard examples. This is because in the text recognition task, all training samples are simulated via controlling several kinds of data distributions, since hand-writing data in real word are involved to data privacy and security and are hard to access. In this way, the recognition difficulty of the simulated samples is different. This results in an issue that easy examples overwhelm the training. To avoid this issue and improve the training efficiency, the system disclosed uses a training loss (method) to handle this imbalance between hard and easy samples. The system uses a multi-class based gradient harmonizing mechanism (GHM) loss. The system performs a K-class classification to recognize characters. The system recognizes easy and hard samples in the training dataset and adaptively assigns large loss weights to hard samples at each iteration during the training process for more effective learning.

Overall System Environment

FIG. 1 is a block diagram of a system environment including a computing system that uses a double attention network, in accordance with an embodiment. The system environment 100 shown in FIG. 1 comprises an online system 130, client devices 110A, 110B, and a network 120. In alternative configurations, different and/or additional components may be included in the system environment 100. The computing system 130 may be an online system but may also work offline, for example, by performing batch processing for performing scene text recognition.

The computing system 130 includes the double attention neural network 140. The computing system 130 receives one or more scene images 135, for example, from the client devices 110. In an embodiment, the client device 110 may include a camera that captures the scene image. The double attention neural network 140 receives a scene image 135 and processes the scene image to extract text 145 from the scene image 135. The text 145 may be further processed by the computing system for other applications or provided to the client device 110 for display or for further processing.

In an embodiment, the text 155 recognized by the double attention neural network 140 from the scene image 135 may represent a road sign that is used for preparing maps of a geographical region. For example, the computing system 130 may be associated with an autonomous vehicle that uses the text 155 for identifying road signs for use in navigation of the autonomous vehicle. The autonomous vehicle may use the road sign to determine the next action that the autonomous vehicle needs to take. Alternatively, the autonomous vehicle may determine the location of the autonomous vehicle based on text 155 recognized from the scene around autonomous vehicle. Other applications of the double attention neural network 140 include recognizing objects such as products on shelves of a store to automatically determine the inventory available in a store. Other applications of the double attention neural network 140 include image searching by matching a receive image against images stored in a database based on comparison of the text extracted from the image and the text extracted from images of the database.

Here only two client devices 110a, 110b are illustrated but there may be multiple instances of each of these entities. For example, there may be several computing systems 130 and dozens or hundreds of client devices 110 in communication with each computing system 130. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral.

The client devices 110 are computing devices such as smartphones with an operating system such as ANDROID® or APPLE® IOS®, tablet computers, laptop computers, desktop computers, electronic stereos in automobiles or other vehicles, or any other type of network-enabled device on which digital content may be listened to or otherwise experienced. Typical client devices 110 include the hardware and software needed to connect to the network 150 (e.g., via Wifi and/or 4G or other wireless telecommunication standards).

The client device 110 includes a client application 120 that allows a user of the client device 110 to interact with the computing system 130. For example, the client application 120 may be a user interface that allows users to capture a scene image that is sent to the computing system 130. The client application 120 may receive the text extracted from the scene image determined by the computing system 130 and process it further. In an embodiment, the client application 120 is a browser that allows users of client devices 110 to interact with a web server executing on the computing system 130.

The computing system 130 includes software for performing a group of coordinated functions or tasks. The software may allow users of the computing system 130 to perform certain tasks or activities of interest, or may include system software (e.g., operating systems) that provide certain functionalities and services to other software. The computing system 130 receives requests from client devices 110 and executes computer programs associated with the received requests. As an example, the computing system 130 may execute computer programs responsive to a request from a client device 110 to translate natural language queries to database queries. Software executing on the computing system 130 can include a complex collection of computer programs, libraries, and related data that are written in a collaborative manner, in which multiple parties or teams are responsible for managing different components of the software.

The network 150 provides a communication infrastructure between the client devices 110 and the record management system 130. The network 150 is typically the Internet, but may be any network, including but not limited to a Local Area Network (LAN), a Metropolitan Area Network (MAN), a Wide Area Network (WAN), a mobile wired or wireless network, a private network, or a virtual private network. Portions of the network 150 may be provided by links using communications technologies including WiFi based on the IEEE 802.11 standard, the BLUETOOTH short range standard, and the Wireless Universal Serial Bus (USB) standard.

System Architecture

Figure 2:
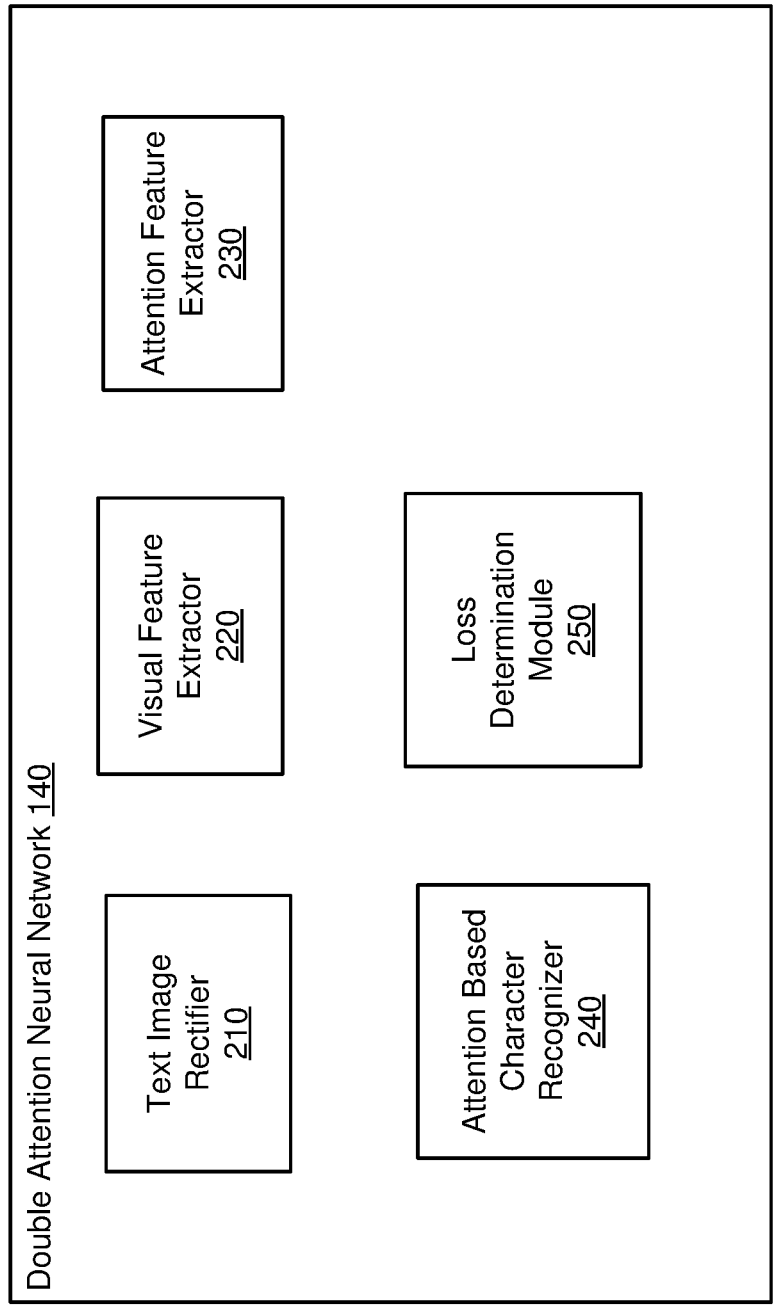

FIG. 2 illustrates the system architecture of the double attention neural network, in accordance with an embodiment. The double attention neural network 140 comprises a text image rectifier 210, a visual feature extractor 220, an attention feature extractor 230, an attention based character recognizer 240, and a loss determination module 250. Conventional components such as network interfaces, security functions, load balancers, failover servers, management and network operation consoles, and the like are not shown so as to not obscure the details of the system architecture.

Figure 3:
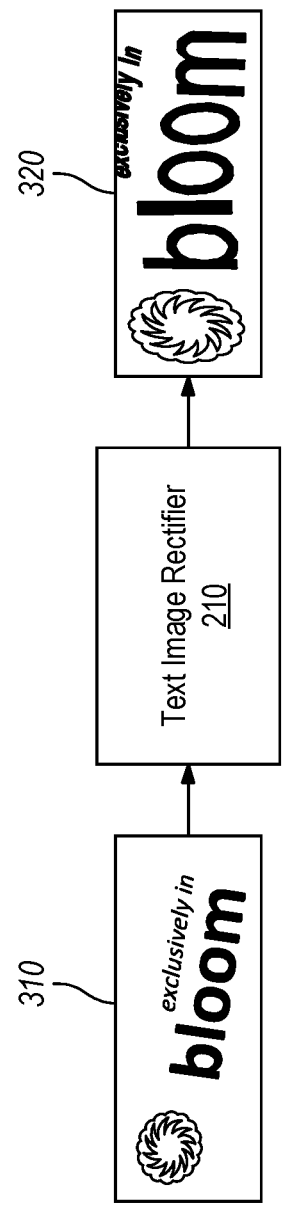
FIG. 3 illustrates the text rectifier module of the double attention neural network, in accordance with an embodiment.

FIG. 3 illustrates the system architecture of the double attention neural network, in accordance with an embodiment. The text image rectifier 210 transforms the input image and rectified distorted images of text for further processing. Texts in the images of scenes may have various shapes and distorted patterns. For example, texts in billboards may be crooked due to the environment, photograph angle, and so on. These irregular texts make it difficult to perform scene text recognition. Therefore, the text image rectifier 210 rectifies these irregular texts before performing further processing. FIG. 3 shows text 310 rectified by the text image rectifier 210 to obtain text 320 that is rectified and easier to process.

According to an embodiment, the text image rectifier 210 learns the offset of each pixel in the text image and uses the offset for rectifying the text. The text image rectifier 210 divides the image into several parts and then the offset of each part. For example, with an input size of 32×100, the text image rectifier 210 divides the image into 3×11 parts. The offset includes the offset on x-coordinate and y-coordinate, and thus has two channels. The value of each offset belongs to the range [−1, 1].

According to an embodiment, the text image rectifier 210 uses bilinear interpolation to resize the offset map from 3×11 to 32×100. The text image rectifier 210 uses the resized offset map to rectify each pixel in the image. For example, if the coordinates of the top-left pixel are (−1, −1) and the coordinate of the bottom-right are (1, 1). Then the new position basic (c, i, j) of the (i, j)$^{th}$ pixel becomes the sum of the offset (c, i, j) and basic (c, i, j), for example, as determined using equation offset (c, i, j)'=offset (c, i, j)+basic (c, i, j), where c=1 and c=2 respectively denote the x-coordinate and y-coordinate, offset (c, i, j) denotes the offset of the (i,j) position learnt by the text image rectifier 210, offset (i, j)' denotes the new offset of the (i,j) position. After this rectifying, the characters can be recognized more easily. According to an embodiment, the text image rectifier 210 uses a convolution neural network that comprises a sequence of maxpooling and convolution layers.

Figure 4:
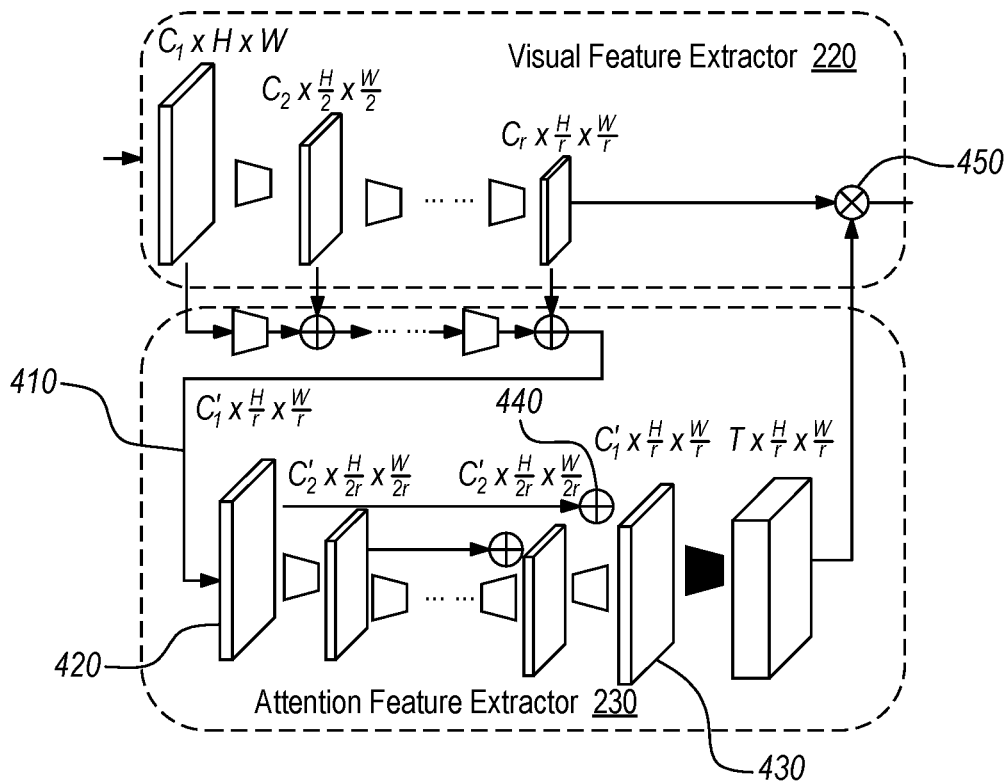
FIG. 4 illustrates the visual feature extractor and attention feature extractor modules of the double attention neural network, in accordance with an embodiment.

FIG. 4 illustrates the visual feature extractor and attention feature extractor modules of the double attention neural network, in accordance with an embodiment. The visual feature extractor 220 extracts visual features from the input image. The term visual features refers to the feature vector generated by the neural network of the visual feature extractor 220 for a given input image. According to an embodiment, the visual feature extractor 220 comprises a multi-layer neural network, for example, a residual neural network (or resnet) of multiple layers.

The attention feature extractor 230 receives multi-scale visual features from the visual feature extractor 220 as input 410. These multi-scale features are encoded by cascade down sampling convolutional layers 420 and then summarized as input. The attention feature extractor 230 uses a fully convolutional network (FCN) to conduct the attention operation channel-wise. The attention feature extractor 230 uses the fully convolutional network to make dense predictions per-pixel channel-wise (i.e., each channel denotes a heatmap of a class). As an example, the network has 8 layers with channel number 65. In deconvolution stage 430, each output feature is added 440 with the corresponding feature map from convolution stage.

Sigmoid function with channel-wise normalization is used to generate attention maps $A=\{A_i\}_{i=1}^T$, where T denotes the maximum number of channels, i.e., the maximum number of decoding steps, where $$A_i \in \mathbb{R} \frac{H}{r} \times \frac{W}{r}.$$

The attention feature extractor 230 integrates 450 these attention maps $A=\{A_i\}_{i=1}^T$, with the visual features $$F \in \mathbb{R}^{C_r \times \frac{H}{r} \times \frac{W}{r}}$$

learnt by the visual feature extractor 220. The resulting mixed features are aligned with the characters, since each attention map in $A=\{A_i\}_{i=1}^T$, denotes one possible character position in the visual feature. Specifically, the mixed features $$B \in \mathbb{R}^T \times \frac{H}{r} \times \frac{W}{r}$$

are determined using the following equation.

$$B_i = \sum_{t=1}^{C_r} A_i \odot F_t, (i=1,\ldots,T)$$

In this equation $$B_i \in \mathbb{R} \frac{H}{r} \times \frac{W}{r}$$

denotes B[i,:,:], and $$F_i \in \mathbb{R} \frac{H}{r} \times \frac{W}{r}$$

denotes F[i,:,:]. The notation ⊙ denotes a product of corresponding elements of two vectors, i.e., $C_{ij}=X_{ij}*Y_{ij}$ in $C=X \odot Y$. Accordingly, the visual features and the attention features are combined to obtain a set of mixed features comprises by determining a product of corresponding elements of the visual features and attention features and aggregating the products, for example, by adding the products.

Figure 5:
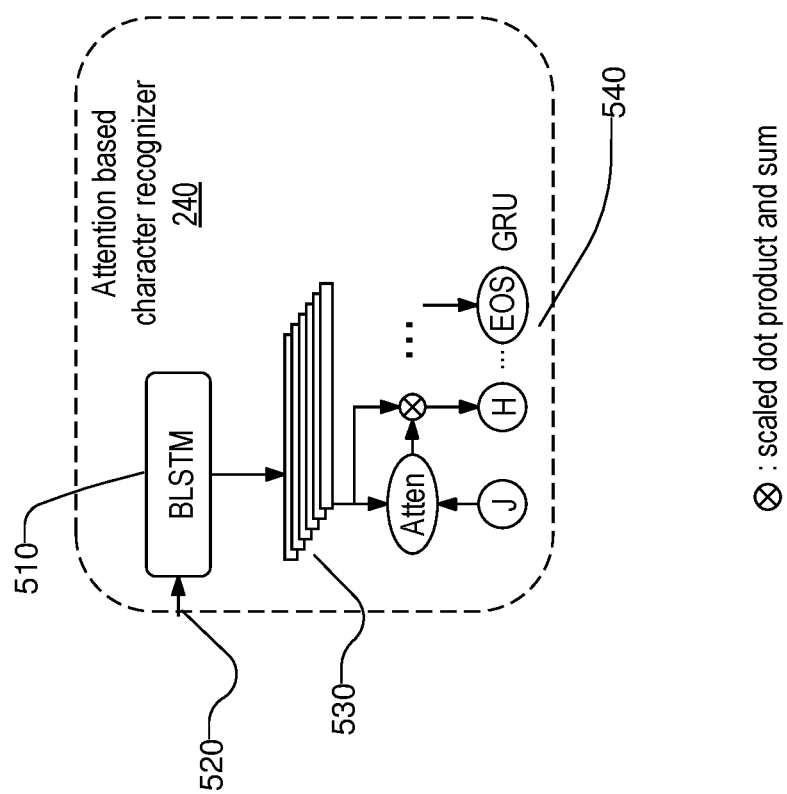
FIG. 5 illustrates the attention based character recognizer module of the double attention neural network, in accordance with an embodiment.

FIG. 5 illustrates the attention based character recognizer module of the double attention neural network, in accordance with an embodiment. The attention based character recognizer 240 predicts the characters in the images. The attention based character recognizer 240 feeds the mixed feature into bidirectional long short-term memory (BLSTM) neural network 510 to obtain the spatial feature. The input 520 of BLSTM is the mixed feature B of size (T*H/r*W/r). The output 530 of BLSTM is a set of spatial features H=[h$_1$, h$_2$, h$_1$].

The computation of the BLSTM may be represented using the following equations.

$$i_t = \sigma(W^{(i)}x_t + U^{(i)}h_{t-1} + b^i)$$

$$f_t = \sigma(W^{(f)}x_t + U^{(f)}h_{t-1} + b^f)$$

$$o_t = \sigma(W^{(o)}x_t + U^{(o)}h_{t-1} + b^o)$$

$$s_t = \tanh(W^{(s)}x_t + U^{(s)}b_{t-1} + b^s)$$

$$ct = i_t \odot s_t + f_t \odot c_{t-1}$$

$$h_t = o_t \odot \tanh(c_t)$$

The input $x_t$ in these equations denotes the mixed features B[t,:,:]. In this context, $h_{t-1}$ denotes the previous spatial feature, $h_0=0$. The remaining variables, such as W, U, and b are neural network parameters that are optimized via the training process. Accordingly, BLSTM processes the feature $B=[B_1, B_2, \ldots, B_t]$ to determine $H=[h_1, h_2, \ldots, h_T]$ along the spatial direction, namely the first direction of size T. Each value $h_t$ denotes the symbol/character feature of the $t^{th}$ symbol/character in the text. The symbol σ represents a nonlinear function such as a softmax function.

The attention based character recognizer 240 uses gated recurrent unit (GRU) 540 to decode/predict the character sequence $(y_1, \ldots, y_n)$. The features 530 generated by the BLSTM 510 are provided as input to the GRU 540. The largest decoding step is T and the decoding process stops when it predicts an end sign 'EOS' of the sequence. The output $y_t$ at the t-step is given by following equation.

$$y_t = \text{softmax}(W_{s_t} + b)$$

In this equation, $s_t$ is the hidden state of time step t and is defined as.

$$s_t = GRU(y_{pre}, g_t, s_{t-1})$$

The computation performed by the GRU is represented by the following set of equations. Initially, for t=0, the output vector is $h_o = 0$.

$$z_t = \sigma_g(W_z x_t + U_z h_{t-1} + b_z)$$

$$r_t = \sigma_g(W_r x_t + U_r h_{t-1} + b_r)$$

$$\hat{h}_t = \phi_h(W_h x_t + U_h(r_t \odot h_{t1}) + b_h)$$

$$h_t = (1-z_t) \odot h_{t1} + z_t \odot \hat{h}_t$$

Variables
$x_t$: input vector
$h_t$: output vector
$\hat{h}_t$: candidate activation vector
$z_t$: update vector
$r_t$: reset gate vector
W, U and b: parameter matrices and vector
Activation Functions
$\sigma_g$: The original is a sigmoid function.
$\phi_h$: The original is a hyperbolic tangent.
The term $y_{pre}$ denotes the embedding vectors of the previous output $y_{t-1}$.

$$y_{pre} = \text{Embedding}(y_{t-1})$$

For text recognition, if there are k characters/symbols, each character/symbol has one feature embedding. In the training phase, since the system receives the label of text, i.e. characters are known in advance, $y_{pre} = \text{Embedding}(y_{t-1})$ denotes the embedding of $(t-1)^{th}$ character in the current image. In the test phase, the system first predicts the label of $y_{t-1}$. Accordingly, the system determines which character $y_{t-1}$ denotes, and thus determines the corresponding character embedding.

The term $g_t$ represents glimpse vectors and is computed as follows.

$$g_i = \sum_{i=1}^{L} \alpha_{t,i} h_i$$

The term $h_i$ denotes the sequential feature vectors and L is the feature map length. The attention score $\alpha_{t,i}$ is computed as follows. The term $\exp(e_{t,i})$ is determined as $\tan h(W_s s_{t-1} + W_h h_i + b_{sh})$. The term $\alpha_{t,i}$ is determined based on a ratio of $\exp(e_{t,i})$ and the sum of $\exp(e_{t,i})$ for all values of i.

$$\alpha_{t,i} = \exp(e_{t,i}) \Big/ \sum_{i=1}^{L} \exp(e_{t,i}), \exp(e_{t,i}) = \tanh(W_s s_{t-1} + W_h h_i + b_{sh})$$

In this equation, $W_s$, $W_h$, $b_{sh}$ are learnable parameters, i.e., the parameters that are adjusted during the training phase. The attention score also aligns the character positions by weighting the hidden state in GRU. Accordingly, the system uses attention mechanism to align character feature with visual feature twice, which is more effective as determined using experimental results. In this way, the character recognizer predicts $(y_1, \ldots, y_n)$.

Scene Text Recognition Process

Figure 6:
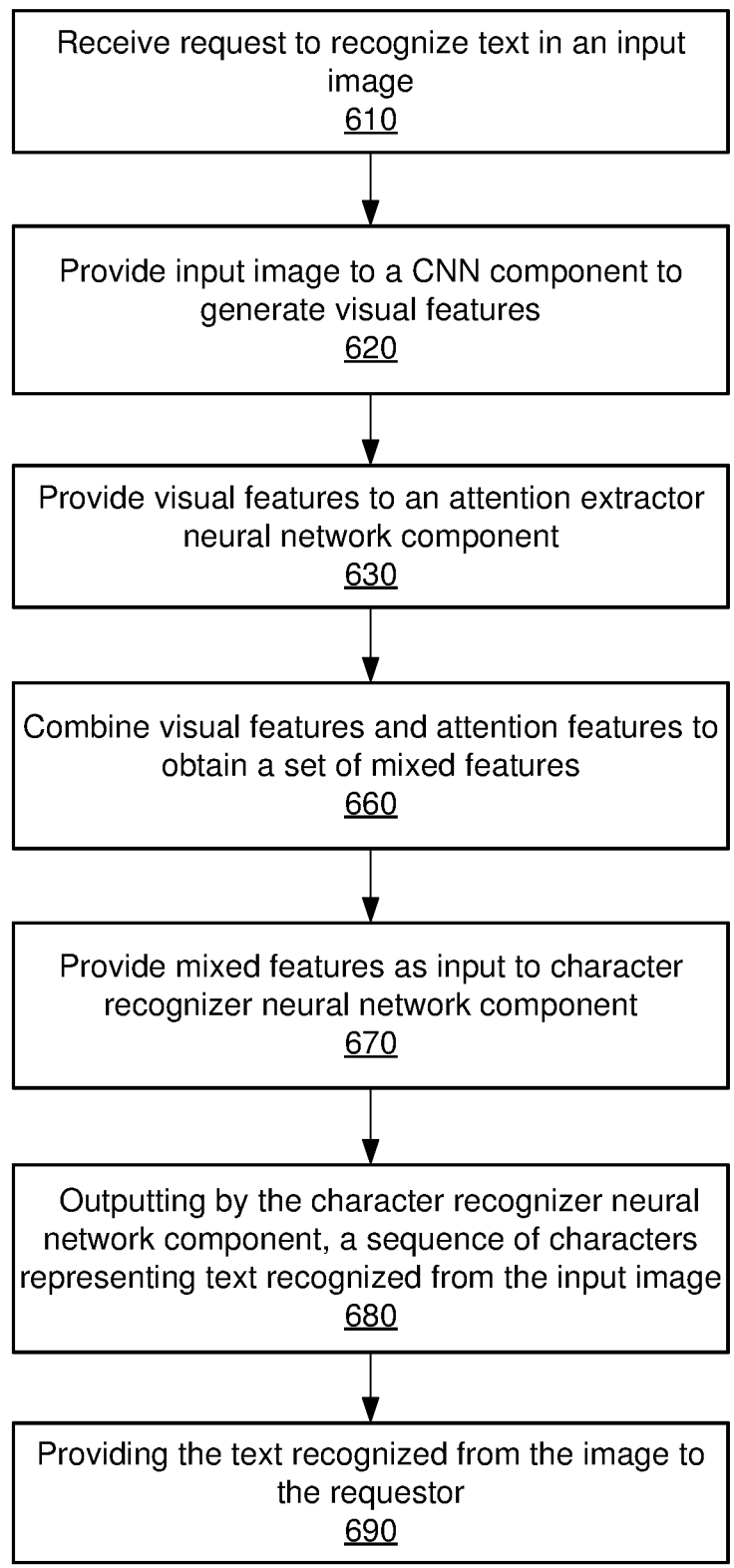
FIG. 6 illustrates the process of scene text recognition using the double attention neural network, according to an embodiment.

FIG. 6 illustrates the process of scene text recognition using the double attention neural network, according to an embodiment. The steps described herein may be performed in an order different from that indicated herein.

The computing system 130 receives 610 a request to recognize text in an input image. The input image comprises a scene with embedded text, for example, a road sign. The computing system 130 provides 620 the input image to a convolutional neural network component, for example, the visual feature extractor 220 to generate visual features based on the input image. The visual features are represented as a feature vector of lower dimension than the input image.

The computing system 130 provides 630 the visual features output by the convolutional neural network component to an attention extractor neural network component, for example, the attention feature extractor 230. The attention extractor neural network component outputs attention features based on the visual features of the input image. An attention feature represents an attention map for a visual feature.

The computing system 130 combines 660 the visual features and the attention features to obtain a set of mixed features and provides 670 the mixed features as input to a character recognizer neural network component, for example, the attention based character recognizer 240.

The character recognizer neural network component generates and outputs 680 an attention score based on hidden features of the character recognizer neural network. Accordingly, two components use attention mechanism, the attention extractor neural network component and the character recognizer neural network component. Accordingly, the neural network based model uses the attention mechanism twice.

The character recognizer neural network component uses the attention score based on the hidden features to determine a sequence of characters representing predicted text recognized from the input image.

The computing system 130 provides 690 the recognized text from the input image to the requestor, for example, to a client device for display or to another module for further processing.

Loss Determination Process

The double attention network 140 is trained by adjusting the neural network parameters to minimize a loss that varies based on a level of difficulty of the sample. Accordingly, the double attention neural network 140 uses different weights for easy and hard samples in the scene text recognition. The gradient harmonizing loss mechanism solves a k-classes classification problem. Furthermore, the double attention network 140 considers the balance of recognition difficulty for different samples. The loss mechanism disclosed according to various embodiments can be used by any machine learning based model configured to recognize scene text and is not limited to the double attention neural network 140.

Figure 7:
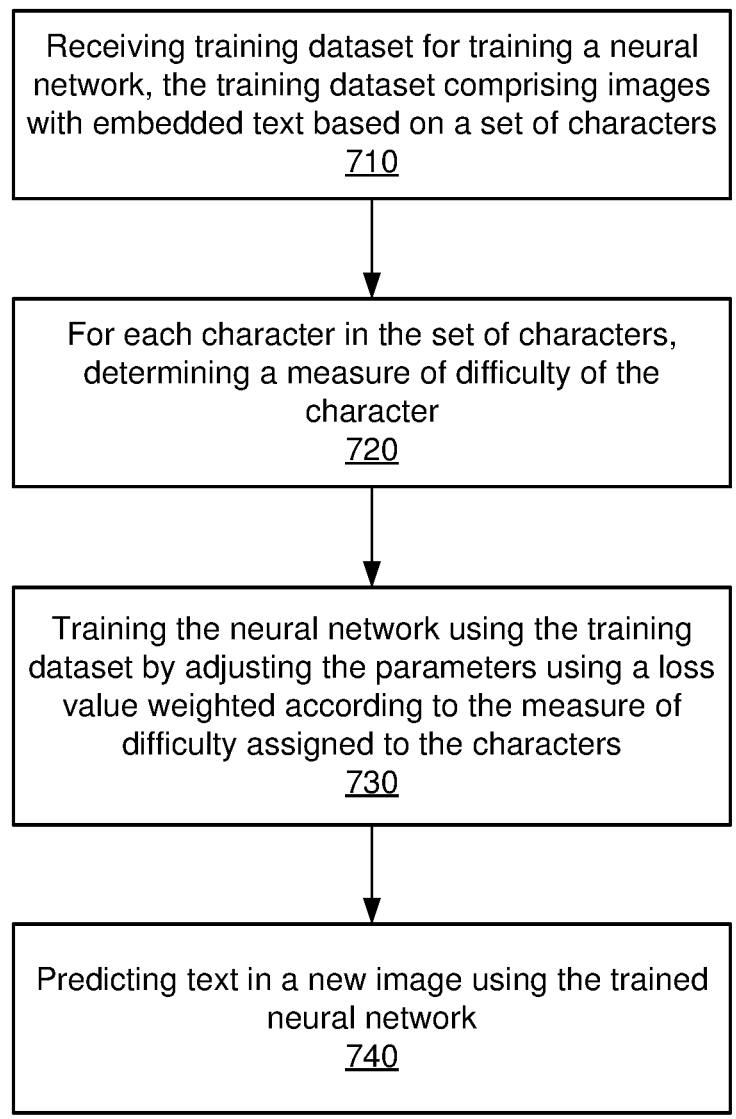
FIG. 7 illustrates the process of adjusting parameters of a neural network for scene text recognition using a loss value weighted according to a measure of difficulty of classifying a character, according to an embodiment.

FIG. 7 illustrates the process of adjusting parameters of a neural network for scene text recognition using a loss value weighted according to a measure of difficulty of classifying a character, according to an embodiment.

The training module 150 receives a training dataset for training a machine learning based model. The machine learning based model may be a double attention neural network model 140 but is not limited to a specific neural network architecture. The process described herein may be applied to any machine learning based model for recognizing text that is based on a set of characters. The process is described in connection with a neural network based model configured to receive an input image and predict a sequence of characters in the input image. The training dataset comprises a plurality of samples, each sample representing an image of a scene with embedded text. The embedded text is based on a set of characters comprising multiple characters.

For each character in the set of characters, the training module 150 determines 720 a measure of difficulty of classifying the character. In an embodiment, the measure of difficulty is determined based on a margin between a likelihood of correct prediction and a likelihood of incorrect prediction for the character based on the neural network based model. The training module 150 trains 730 the neural network based model using the training dataset. The training process adjusts parameters of the neural network based model to minimize a loss value for samples of the training dataset. The loss value for a sample is weighted according to the measure of difficulty assigned to the characters of the sample.

Once the neural network based model is trained, the computing system predicts 740 text in a new input image using the trained neural network based model. For example, the computing system may receive images of scene captured by a camera and processes them to recognize scenes and provide to either a client device for display or to another module for further processing.

The loss determination module 250 uses a gradient harmonizing mechanism (GHM) loss that works on multi-classification problems in text recognition. Instead of using the standard cross entropy loss, the double attention neural network 140 uses multi-classes based GHM loss. Specifically, if there are k different characters in the set of characters, then at each prediction, the neural network performs a k-classes classification. The neural network may use softmax function to compute the probability for each class of the classification problem.

If $(p_1, p_2, p_k)$ denote the probability of each class, given a sample x whose class label is q, the system computes the margin between the sample x being predicted correctly and incorrectly using following equation.

$$p_q - \sum_{i q}^{k} p_i = 2p_q - 1$$

Accordingly, the system uses a margin for a class with a particular label based on a value that is twice the likelihood $p_q$ of that class, e.g., the margin is determined as $2p_q-1$. The system uses this margin to determine a measure indicating whether the sample is hard or easy sample. Specifically, if the margin value $2p_q-1$ is large, for example, above a threshold value, the system determines that the sample is well classified and represents an easy sample. If the margin value $2p_q-1$ is small, for example, below a threshold value, the system determines that the sample is hard sample and is not well classified.

The measure of difficulty of each sample depends on the characters recognized in the sample. For example, if a sample has characters from a set S, the measure of difficulty for the sample is the sum of measure of difficulty of each character in the set S. For hard sample, the system reweights it more such that the model can focus on it more. To obtain the total statistics property of all samples, the system assigns the probability margin $2p_q-1$ into a set of b bins: if for a sample x, $$\frac{2(i-1)}{b} - 1 \le 2p_q - 1 \le \frac{2i}{b} - 1,$$

the sample x belongs to the $i^{th}$ bin. The system computes the total sample number of each bin as $(n_1, n_2, \ldots, n_b)$. Next, the system determines the training loss of the double attention network 140 using the following equation.

$$\frac{1}{N} \sum_{i=1}^{N} \frac{1}{n_{x_i}/N} \ell(x_i, y_i)$$

Where $(x_i, y_i)$ denotes the training data pair, $\ell$ (xi, yi) denotes a loss function for the training data pair, $n_{x_i}$ denotes the sample number of the bin that $x_i$ belongs to. The factor $$\frac{1}{n_{x_i}/N}$$

represents the metric that determines the balance of samples in the bin is according to the recognition difficulty. If $x_i$ is hard, then $$\frac{1}{n_{x_i}/N}$$

usually is larger, since $n_{x_i}$ is small. This allows the system to treat easy and hard samples differently for training the model for text recognition.

Performance Improvement

Experimental data shows improvement in performance obtained by using the techniques disclosed herein. The double attention neural network 140 model was evaluated using various datasets and compared with several existing models. The datasets used for evaluation include IIIT5K-Words including 3000 cropped word images for testing, Street View Text (SVT) collected from the GOOGLE Street View including 647 word images, ICDAR 2003 (IC03) containing 251 scene images labeled with text bounding boxes, ICDAR 2013 including 1015 cropped text images, SVT-Perspective containing 645 cropped images for testing, CUTE80 containing 80 high-resolution images taken in natural scenes, ICDAR 2015 containing 2077 cropped images including more than 200 irregular text, and others. The different models were evaluated on seven real datasets and two synthetic datasets.

The experimental results indicated that the double attention neural network 140 achieved higher classification accuracy than existing models from prior art. The models disclosed were compared with five different neural network architectures described in prior art for scene text recognition. More precisely, about 1.1% average improvement was observed on seven real datasets, and about 3.9% average improvement on two synthetic datasets.

The neural network architecture was further evaluated using a cross entropy loss and the difficulty based GHM loss to measure the improvement obtained by use of the difficulty based GHM loss. By using the difficulty based loss function to fine tune the double attention neural network 140, the performance of the double attention neural network 140 was further improved resulting in about 2.6% average improvement on the real datasets, and outperforming the best baseline by 5.1% average improvement on the synthetic datasets.

The double attention neural network 140 provides improvement of the computing resources required for training the model since higher performance is achieved with smaller training datasets. Accordingly, a comparable performance or even better performance is achieved using smaller training dataset and therefore fewer computing resources.

Computer Architecture

Figure 8:
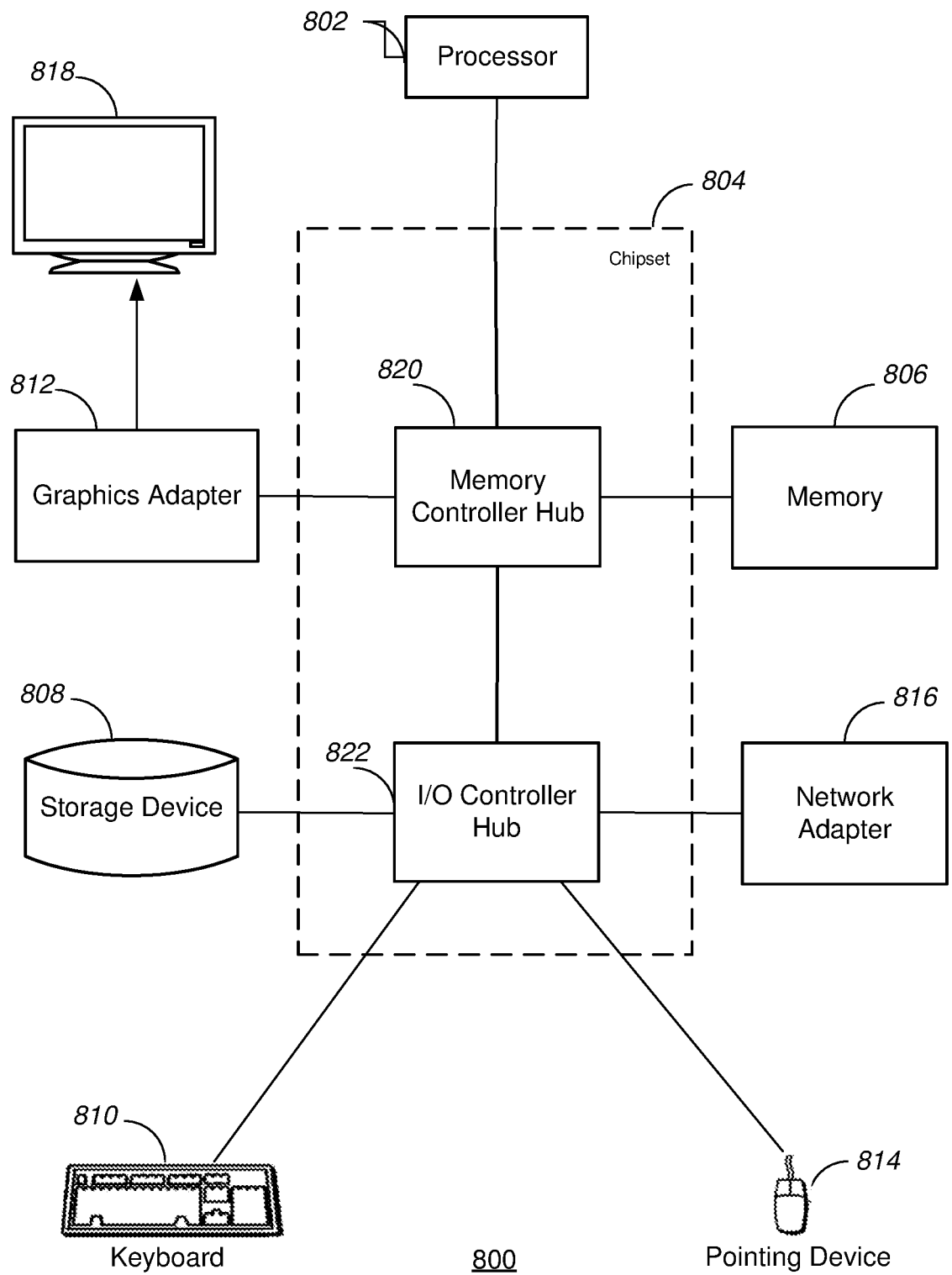
FIG. 8 is a high-level block diagram illustrating an example computer for implementing the client device and/or the computing system of FIG. 1.

FIG. 8 is a high-level block diagram illustrating an example computer for implementing the client device and/or the computing system of FIG. 1. The computer 800 includes at least one processor 802 coupled to a chipset 804. The chipset 804 includes a memory controller hub 820 and an input/output (I/O) controller hub 822. A memory 806 and a graphics adapter 812 are coupled to the memory controller hub 820, and a display 818 is coupled to the graphics adapter 812. A storage device 808, an input device 814, and network adapter 816 are coupled to the I/O controller hub 822. Other embodiments of the computer 800 have different architectures.

The storage device 808 is a non-transitory computer-readable storage medium such as a hard drive, compact disk read-only memory (CD-ROM), DVD, or a solid-state memory device. The memory 806 holds instructions and data used by the processor 802. The input interface 814 is a touch-screen interface, a mouse, track ball, or other type of pointing device, a keyboard, or some combination thereof, and is used to input data into the computer 800. In some embodiments, the computer 800 may be configured to receive input (e.g., commands) from the input interface 814 via gestures from the user. The graphics adapter 812 displays images and other information on the display 818. The network adapter 816 couples the computer 800 to one or more computer networks.

The computer 800 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 808, loaded into the memory 806, and executed by the processor 802.

The types of computers 800 used by the entities of FIG. 1 can vary depending upon the embodiment and the processing power required by the entity. The computers 800 can lack some of the components described above, such as graphics adapters 812, and displays 818. For example, the computing system 130 can be formed of multiple blade servers communicating through a network such as in a server farm.

Alternative Embodiments

It is to be understood that the Figures and descriptions of the disclosed invention have been simplified to illustrate elements that are relevant for a clear understanding of the present invention, while eliminating, for the purpose of clarity, many other elements found in a typical distributed system. Those of ordinary skill in the art may recognize that other elements and/or steps are desirable and/or required in implementing the embodiments. However, because such elements and steps are well known in the art, and because they do not facilitate a better understanding of the embodiments, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for displaying charts using a distortion region through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A computer implemented method for performing scene text recognition using a neural network based model, the method comprising:
   receiving a request to recognize text in an input image, the input image comprising a scene with embedded text;
   providing the input image to a convolutional neural network component to generate visual features and multi-scale visual features based on the input image, the visual features represented as a feature vector of lower dimension than the input image;
   providing the visual features output by the convolutional neural network component to an attention extractor neural network component, wherein the attention extractor neural network component:
      summarizes the multi-scale visual features into summarized visual features;
      generates attention features based on the summarized visual features of the input image, each attention feature corresponding to an attention map for a visual feature, and
      adds attention maps with corresponding attention features to generate added attention features;
   combining the visual features and the added attention features to obtain mixed features;
   providing the mixed features as input to a character recognizer neural network component, wherein the character recognizer neural network component generates an attention score based on hidden features of the character recognizer neural network, the character recognizer neural network component outputting a sequence of characters representing predicted text recognized from the input image; and
   providing the recognized text from the input image for display.

2. The method of claim 1, further comprising:
   receiving a training dataset for training the neural network based model, the training dataset comprising a plurality of samples;
   for each character in a set of characters, determining a measure of difficulty of classifying the character based on a margin between a likelihood of correct prediction and a likelihood of incorrect prediction for the character based on the neural network based model; and
   training the neural network based model using the training dataset, the training adjusting parameters of the neural network based model to minimize a loss value for samples of the training dataset, wherein a loss value for a sample is weighted according to the measure of difficulty assigned to the characters of the sample.

3. The method of claim 1, further comprising:
   transforming the input image by a text image rectifier to modify at least a portion of the input image comprising text, wherein the transformed image is provided as input to the convolutional neural network component.

4. The method of claim 1, wherein the convolutional neural network component comprises a residual neural network.

5. The method of claim 1, wherein the character recognizer neural network component comprises a binary long short-term memory (BLSTM) neural network that receives as input the mixed features and generates a set of spatial features.

6. The method of claim 5, wherein the set of spatial features is provided as input to a gated recurrent unit that predicts the character sequence.

7. The method of claim 1, wherein combining the visual features and the attention features to obtain a set of mixed features comprises determining a product of corresponding elements of the visual features and attention features and aggregating the products.

8. A computer implemented method for performing scene text recognition, the method comprising:
   receiving a training dataset for training a machine learning based model, the training dataset comprising a plurality of samples, each sample representing an image comprising a scene with embedded text based on a set of characters, the machine learning based model configured to receive an input image and predict a sequence of characters in the input image, wherein the machine learning based model comprising:
      a convolutional neural network component configured to receive the image to generate visual features and multi-scale visual features, the visual features represented as a feature vector of lower dimension than the image,
      an attention extractor neural network component configured to:
         receive the multi-scale visual features output by the convolutional neural network,
         summarize the multi-scale visual features into summarized visual features,
         generate attention features based on the summarized visual features, each attention feature corresponding to an attention map for a visual feature, and
         add attention maps with corresponding attention features to generate added attention features, and
      a character recognizer neural network component configured to receive mixed features generated by combining the visual features and the added attention features to output a sequence of characters representing predicted text recognized from the image;
   for each character in the set of characters, determining a measure of difficulty of classifying the character;
   training the machine learning based model using the training dataset, the training adjusting parameters of the machine learning based model to minimize a loss value for samples of the training dataset, wherein a loss value for a sample is weighted according to the measure of difficulty assigned to the characters of the sample; and
   predicting text in a new input image using the trained machine learning based model.

9. The method of claim 8, wherein the measure of difficulty of classifying the character is determined based on a margin between a likelihood of correct prediction and a likelihood of incorrect prediction for the character based on the machine learning based model.

10. The method of claim 8, wherein the measure of difficulty of a sample comprising a plurality of characters is determined as a sum of the measure of difficulty of each character from the plurality of characters.

11. The method of claim 8, wherein the machine learning based model is a neural network.

12. The method of claim 11, wherein the neural network comprises a convolutional neural network component to generate visual features based on the input image, the visual features represented as a feature vector of lower dimension than the input image.

13. The method of claim 11, the method further comprising:
providing the visual features output by the convolutional neural network component to an attention extractor neural network component, wherein the attention extractor neural network component outputs attention features based on the visual features of the input image, each attention feature representing an attention map for a visual feature.

14. The method of claim 13, the method further comprising:
combining the visual features and the attention features to obtain a set of mixed features and providing the mixed features as input to a character recognizer neural network component, wherein the character recognizer neural network component generates an attention score based on hidden features of the character recognizer neural network, the character recognizer neural network component outputting a sequence of characters representing predicted text recognized from the input image.

15. A computer system comprising:
one or more computer processors; and
a non-transitory computer readable storage medium storing instructions that when executed by the one or more processors causes the one or more processors to perform operations comprising:
receiving a request to recognize text in an input image, the input image comprising a scene with embedded text;
providing the input image to a convolutional neural network component to generate visual features and multi-scale visual features based on the input image, the visual features represented as a feature vector of lower dimension than the input image;
providing the multi-scale visual features output by the convolutional neural network component to an attention extractor neural network component, wherein the attention extractor neural network component:
summarizes the multi-scale visual features into summarized visual features;
generates attention features based on the summarized visual features of the input image, each attention feature corresponding to an attention map for a visual feature, and
adds attention maps to corresponding attention features to generate added attention features;
combining the visual features and the added attention features to obtain mixed features;
providing the mixed features as input to a character recognizer neural network component, wherein the character recognizer neural network component generates an attention score based on hidden features of the character recognizer neural network, the character recognizer neural network component outputting a sequence of characters representing predicted text recognized from the input image; and
providing the recognized text from the input image for display.

16. The computer system of claim 15, wherein the instructions further cause the one or more processors to perform operations comprising:
receiving a training dataset for training a neural network based model, the training dataset comprising a plurality of samples;
for each character in a set of characters, determining a measure of difficulty of classifying the character based on a margin between a likelihood of correct prediction and a likelihood of incorrect prediction for the character based on the neural network based model; and
training the neural network based model using the training dataset, the training adjusting parameters of the neural network based model to minimize a loss value for samples of the training dataset, wherein a loss value for a sample is weighted according to the measure of difficulty assigned to the characters of the sample.

17. The computer system of claim 15, wherein the instructions further cause the one or more processors to perform operations comprising:
transforming the input image by a text image rectifier to modify at least a portion of the input image comprising text, wherein the transformed image is provided as input to the convolutional neural network component.

18. The computer system of claim 15, wherein the character recognizer neural network component comprises a binary long short-term memory (BLSTM) neural network that receives as input the mixed features and generates a set of spatial features.

19. The computer system of claim 15, wherein combining the visual features and the attention features to obtain a set of mixed features comprises determining a product of corresponding elements of the visual features and attention features and aggregating the products.

* * * * *